United States Patent

Ohashi et al.

[11] Patent Number: 5,936,600
[45] Date of Patent: Aug. 10, 1999

[54] LIQUID CRYSTAL DISPLAY DEVICE

[75] Inventors: Ryouhei Ohashi, Tokyo; Terutaka Okano, Tokorozawa; Masao Kita, Tanashi, all of Japan

[73] Assignee: Citizen Watch Co., Ltd., Tokyo, Japan

[21] Appl. No.: 08/904,885

[22] Filed: Aug. 4, 1997

Related U.S. Application Data

[62] Continuation of application No. 08/756,602, Nov. 27, 1996, abandoned, which is a continuation of application No. 08/481,258, filed as application No. PCT/JP94/01865, Nov. 4, 1994, abandoned.

[30] Foreign Application Priority Data

| Nov. 4, 1993 | [JP] | Japan | 5-059335 |
| Nov. 4, 1993 | [JP] | Japan | 5-059336 |
| Sep. 27, 1994 | [JP] | Japan | 6-231446 |

[51] Int. Cl.⁶ ................... G09G 3/36
[52] U.S. Cl. ............... 345/87; 349/58
[58] Field of Search ............ 345/108, 87, 55, 345/205, 209, 905, 4; 348/790; 349/56, 58, 60, 155, 156, 157

[56] References Cited

U.S. PATENT DOCUMENTS 5,146,354  9/1992  Plesinger .................. 369/83

FOREIGN PATENT DOCUMENTS

| 1225920 | 9/1989 | Japan | 359/53 |
| 3-59539 | 3/1991 | Japan . | |
| 4-204822 | 7/1992 | Japan . | |
| 5-19276 | 1/1993 | Japan . | |
| 9015359 | 12/1990 | WIPO | 359/83 |

OTHER PUBLICATIONS

English translation of JP–A–4–204822 (Utena) (6 pages).
Patent Abstracts of Japan, Publication No. 03–021923, Jan. 30, 1991, vol. 015, No. 149, Hitachi Ltd; Hitachi Device Eng Co. Ltd. (1 page).
Patent Abstracts of Japan, Publication No. 55–064215, May 14, 1980, vol. 004, No. 107, Citizen Watch Co. Ltd. (1 page).
Patent Abstracts of Japan, Publication No. 01–225920, Sep. 8,1989, vol. 013, No. 543, Seiko Epson Corp. (1 page).
Supplementary European Search Report, dated Jun. 13, 1997 (1 page) Communication, dated Jun. 24, 1997, (1 page).

*Primary Examiner*—Dennis-Doon Chow
*Attorney, Agent, or Firm*—Finnegan, Henderson, Farabow, Garrett & Dunner, L.L.P.

[57] ABSTRACT

A liquid crystal display device (1) for the purpose providing a compact liquid crystal display device has two liquid crystal panels, which are a drive liquid crystal panel and a compensating panel, a frame (50), which has a receiving area (52) for the purpose of receiving at least one liquid crystal panel, and a spacer (80), which is made from a light-blocking material and configured as a panel frame, covers the liquid crystal panels and is located between the each liquid crystal panel, the panel frame being made of a material that acts as an electromagnetic shield, wherein a step between an upper and a lower glass elements forming the liquid crystal panel is utilized to locate positioners within the space of the liquid crystal panel.

15 Claims, 4 Drawing Sheets

LIQUID CRYSTAL DISPLAY DEVICE

This application is a continuation of application Ser. No. 08/756,602, filed Nov. 27, 1996, now abandoned, which is a continuation of Ser. No. 08/481,258, filed Jun. 30, 1995, now abandoned, which is a 371 of PCT/JP9401865, filed Nov. 4, 1994.

BACKGROUND OF THE INVENTION

1. Field of the Invention

The present invention relates to a portable liquid crystal display device which uses a liquid crystal panel, and more specifically it relates to a support structure for a liquid crystal panel.

2. Description of the Related Art

A known type of liquid crystal panel is the passive liquid crystal panel which consists of a liquid crystal material sandwiched between two transparent substrates which are made of glass or film, with electrodes provided, on the opposing faces of the two substrates, so that they are mutually perpendicular, and the active liquid crystal panel, in which an electrode is provided on one of the opposing faces of two substrates, and a TFT thin-film transistor, MIM (metal-insulator-metal), or the like is formed on the other opposing face.

Liquid crystal panels can be classified in terms of operation as TN (twisted nematic) and STN (super twisted nematic) liquid crystal panels. The STN mode of operation is used in passive liquid crystal panels and the TN mode is used in both active liquid crystal panels and passive liquid crystal panels.

Active matrix liquid crystal display (LCD) panels are used as liquid crystal panels for a high-quality display. However, the active matrix LCD panels present the problem of the liquid crystal display device being high in cost. On the other hand, while TN passive liquid crystal panels are inexpensive, they are very inferior to active liquid crystal panels in terms of display quality.

In consideration of the above-noted types of liquid crystal panels, recent years have seen the appearance of commercial embodiments of a portable TV picture receiver, which consists of a compact, lightweight liquid crystal display device with a TV reception function, a liquid crystal projector, and a hand-held personal computer these products taking advantage of the benefits of liquid crystal panels. With this situation as the backdrop, there is a demand for compact, low-cost liquid crystal display devices.

The prior art will be described in connection with FIG. 5 and FIG. 6, which show a liquid crystal display device of the past. FIG. 5 is a perspective view which shows a simplified view of a liquid crystal display device of the past, and FIG. 6 is a cross-sectional view along the cutting plane A—A shown in FIG. 5. The construction of the liquid crystal display device shown in FIG. 6 is such that it includes, in sequence as seen from the display surface 13, a liquid crystal panel 10, an illumination device 20, a flexible printed circuit 40, and a circuit board 30 housed within a frame 50 which is supported by positioning member 51 provided on the frame 50. In FIG. 6, the approximately transparent protective board, such as a glass or an acrylic resin board which is positioned on top of the liquid crystal panel has been omitted.

The liquid crystal panel 10 is configured so as to have two opposing transparent glass or plastic material between which is sealed by means of a sealant a liquid material, and can also be constructed so as to further have a driving integrated circuit mounted, using the COG method, onto a board made of a glass or plastic positioned outside of the sealant for the purpose of driving the electrodes of the display element. The illumination device 20 is configured to have a fluorescent tube, a reflector which is positioned behind the fluorescent tube and which reflects the light of the fluorescent tube onto the liquid crystal panel 10, and a diffusing element which is positioned in front of the fluorescent tube and which diffuses the light.

In the past, active liquid crystal panels were used in making liquid crystal display devices, and a TN passive liquid crystal panel is used in the configuration shown in FIG. 6. As described above, however, active liquid crystal panels are expensive, and passive liquid crystal panels, while they are inexpensive, have greatly inferior display quality. For that reason, by using an STN passive liquid crystal panel a liquid crystal panel was achieved with a suitable balance between the above-noted cost and appearance.

An STN passive liquid crystal panel is less expensive than an active liquid crystal panel, and has better appearance than conventional passive liquid crystal panels. However, when using an STN passive liquid crystal panel in a liquid crystal display device, unwanted colors are imparted to the light which is transmitted through the liquid crystal panel, resulting in the discoloration of a black-and-white display screen. For this reason, a compensating element in the form of a compensation cell such as a compensation film or liquid crystal panel or the like is generally installed with the liquid crystal panel (hereinafter referred to a drive panel) to eliminate the above-noted discoloration.

When installing a compensating element on a drive panel as noted above, because the compensating element and the drive panel are directly overlaid in the frame 50 in manner similar to that shown in FIG. 6, a large number of positioning members are provided on the frame to position and support the drive panel and compensating element. Also, because the drive panel has either external circuit connecting terminals or a COG mounting area, the dimensions of the drive panel are larger than those of the compensating element, preventing the positioning of both the drive panel and the compensating element by means of common positing elements, making necessary a large number of positioners, this leading to, among other things, an increase in the complexity of the frame which has the positioners, thereby preventing the achievement of a sufficiently compact liquid crystal display device and causing an increase in the price of the product.

In addition, in a construction which is similar to that described above, because the drive panel and the compensating element are directly overlaid, when either the drive panel or the compensating element is broken, to remove the broken drive panel or compensating element, there is a risk of damaging the display surface of the good compensating element or drive panel, and vibration that is receive in transport and the like can also cause a skewing of the drive panel and the compensating element, which can damage them. Another problem is that because at least two liquid crystal panels are used supporting members for each liquid crystal panel are required, this causing an increase in the size of the liquid crystal display device.

Another problem is that the means to solve the above-noted problems makes the positioning of the above-noted drive panel and compensating element complex.

SUMMARY OF THE INVENTION

An object of the present invention is to solve the problems existing as described above in the prior art, and to provide a liquid crystal display device which has a compact and thin liquid crystal panel, and which offers simplification and facilitation of the manufacturing processes, and further enables a reduction in manufacturing cost.

To achieve the above-mentioned object, the present invention has a technical constitution as noted below. Specifically, the present invention is a liquid crystal display device which has at least two liquid crystal panels, a circuit, and a frame, wherein a receiver is provided on the frame to receive at least one liquid crystal panel, a spacer is installed between the liquid crystal panels, and the above-noted at least two liquid crystal panels include a drive liquid crystal panel and a compensation liquid crystal panel.

In another form of the present invention, the liquid crystal display device has at least two liquid crystal panels, a spacer between these liquid crystal panels, and a frame, wherein a spacer support and positioner are provided on the frame and further wherein a cutout is provided on the spacer for the purpose of positioning.

By virtue of the constitution of the present invention, the liquid crystal panels are placed into the receiver in the frame, assembly being done in the sequence of the first liquid crystal panel, the spacer, and then the second liquid crystal panel, so that it is possible to achieve a liquid crystal display device with few liquid crystal panel supporting parts, the spacer serving as a shock-absorbing material between the liquid crystal panels, thereby achieving easy replacement of the panels in maintenance.

Figure 3A:
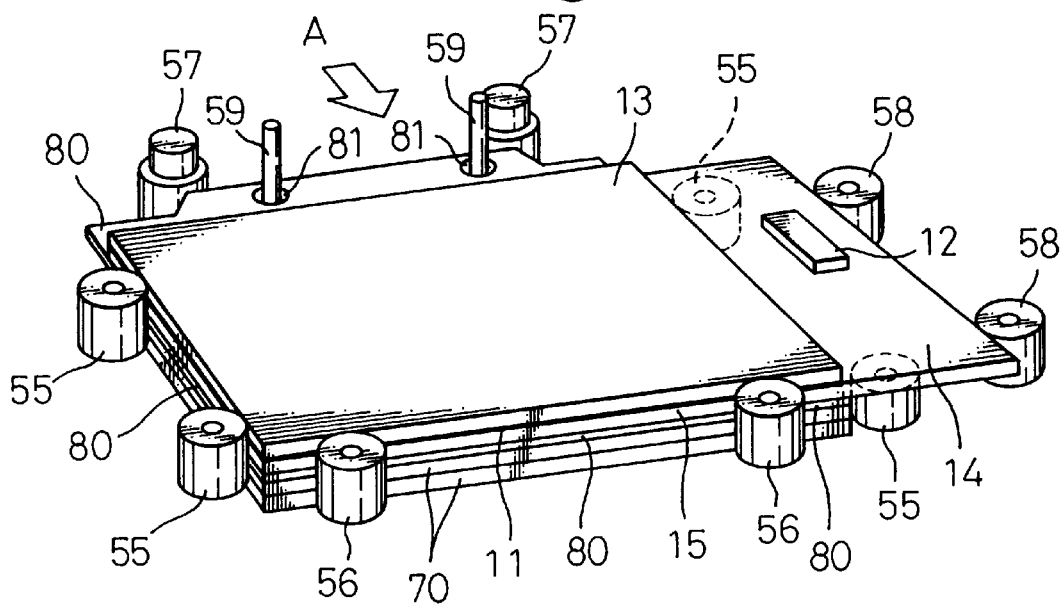
Figure 3B:
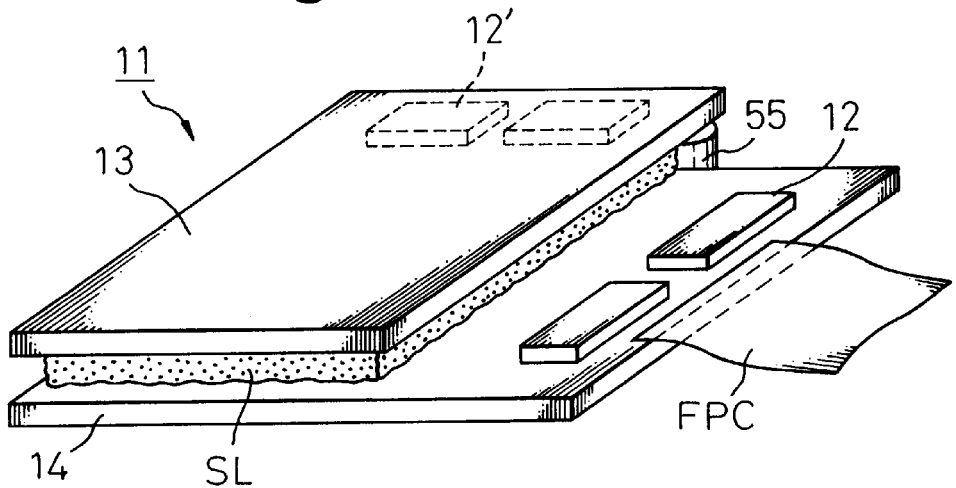
Figure 3C:
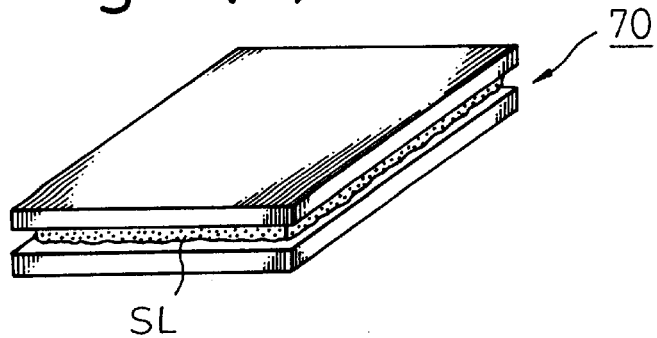

FIGS. (3A)–(3C) are three perspective views of a liquid crystal display device which is the third embodiment of the present invention, with FIG. 3A showing the main parts of that embodiment, FIG. 3B showing an enlarged view of the drive panel of the liquid crystal display device, and FIG. 3C showing an enlarged view of the compensating panel of the liquid crystal display device.

Figure 4:
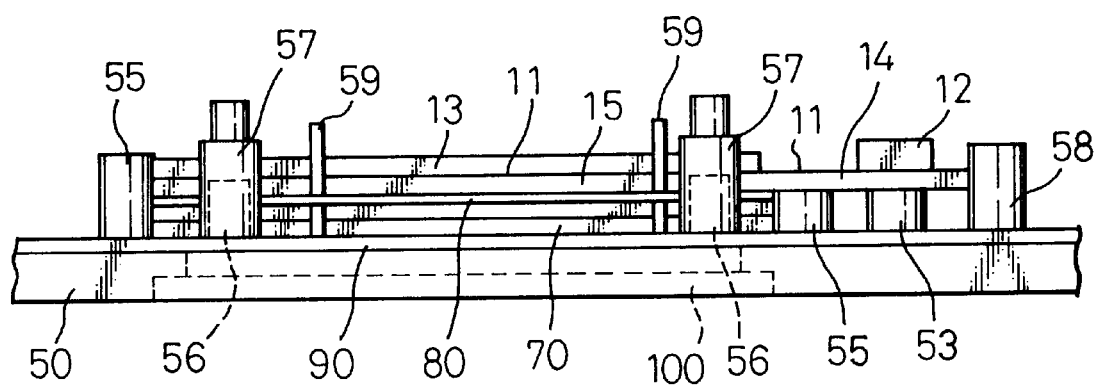

FIG. 4 is a side elevation view of the device of FIG. 3A, which is the third embodiment of the present invention, as viewed in the direction of the arrow A in FIG. 3A.

Figure 5:
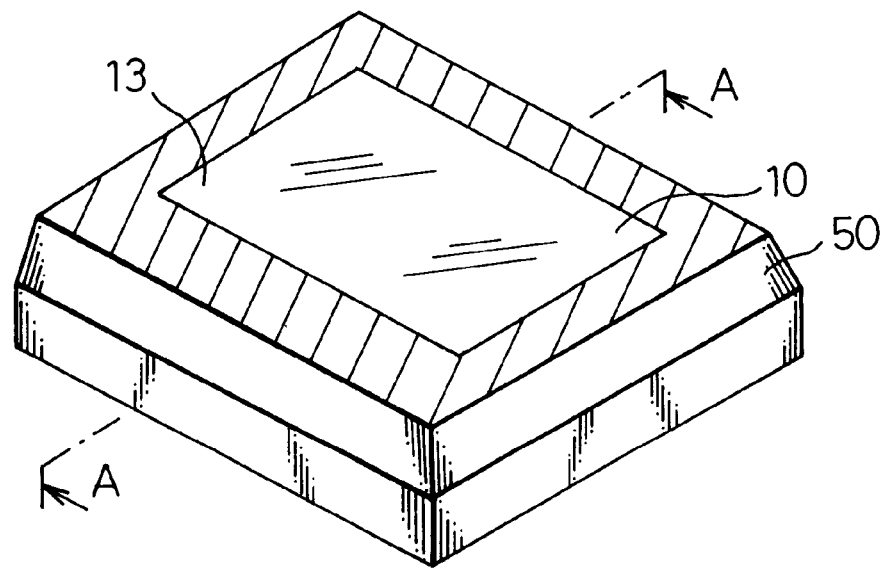

FIG. 5 is an outer perspective view of a liquid crystal display device in the prior art.

Figure 6:
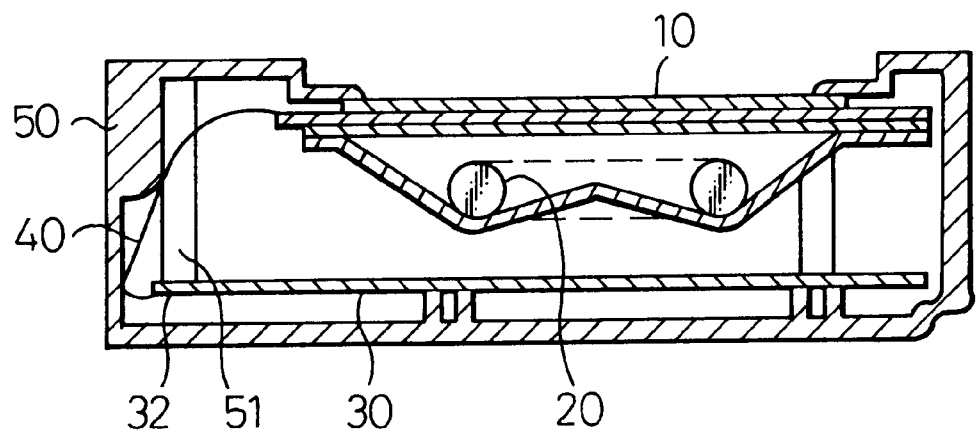

FIG. 6 is a cross-sectional view which shows the prior art of the liquid crystal display device of FIG. 5.

DESCRIPTION OF THE PREFERRED EMBODIMENT

The first embodiment of a liquid crystal display device according to the present invention basically has, as described above, at least two liquid crystal panels, a circuit, and a frame, and additionally the frame has a receiver to receive at least one of the above-noted liquid crystal panels, and a spacer which is located between the liquid crystal panels. In addition, another form of the present invention has a protrusion formed on the frame, this corresponding with the above-noted receiver. In yet another form of the present invention the above-noted liquid crystal panels include a drive liquid crystal panel and a compensating liquid crystal panel. In yet another form of the first embodiment of the present invention, the above-noted spacer is made from an optically opaque material, and in yet another form the above-noted spacer is formed from a panel frame which covers the liquid crystal panels. In another example of the first embodiment of the present invention, the above-noted panel frame is made from an electromagnetic shielding material.

A second aspect of the liquid crystal display device of the present invention has at least two liquid crystal panels, spacers between each of the liquid crystal panels, and a frame, the above-noted frame having provided on it a spacer support and positioner, and the above-noted spacers having cutouts provided in them for the purpose of positioning. In a second example of the second embodiment of the liquid crystal display device of the present invention, the liquid crystal panels are positioned by means of a plurality of positioners. In a third example the liquid crystal display device has liquid crystal which is held between two transparent sheets, with the circumference around the liquid crystal being sealed by a sealant, the liquid crystal display device having at least one liquid crystal panel which has the above-noted transparent sheets which hold the liquid crystal between them, the transparent sheets having an extension part and there being a step in the liquid crystal panel, and further wherein the above-noted frame having a plurality of positioners for the purpose of positioning at least one liquid crystal panel, some of the positioners coming into physical contact with the above-noted step in the liquid crystal panel and supporting the above-noted extension part.

Each example of the first embodiment of the present invention will be described in sequence below, with reference made to the cross-sectional view provided in FIG. 1, which shows this embodiment.

Figure 1:
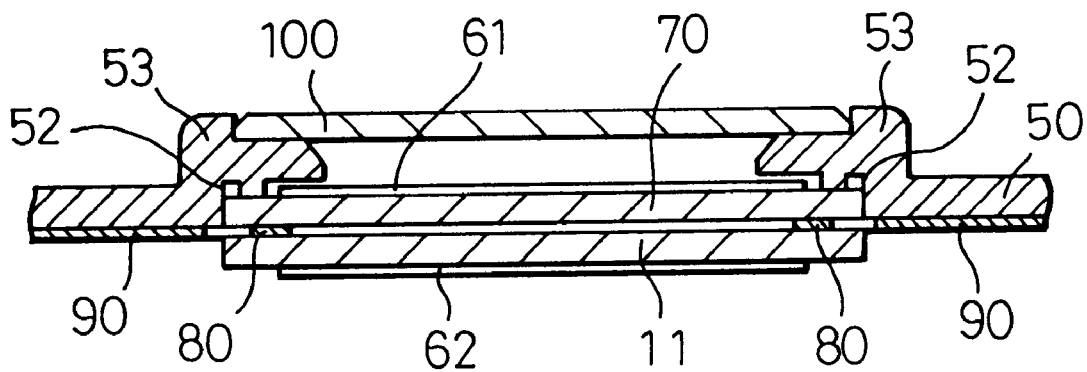
FIG. 1 is a cross-sectional view of a liquid crystal display device which is the first embodiment of the present invention.

FIG. 1 shows the construction of the first example of a liquid crystal panel of the first embodiment of the present invention, in which the liquid crystal display device includes at least two liquid crystal panels 11 and 70. This example shows an STN passive liquid crystal panel used in the liquid crystal display device. The STN passive liquid crystal panel (drive panel) 11 is less expensive than an active type liquid crystal panel, and has a superior appearance in comparison with a TN passive liquid crystal panel. However, when an STN passive liquid crystal panel (drive panel) is used in a liquid crystal display device, color is imparted to the light which passes through the liquid crystal panels, so that the black-and-white that is to be displayed is discolored. For this reason, a compensating element in the form of a compensation cell such as a compensation film or liquid crystal panel or the like is generally installed with the drive panel to prevent discolor.

The drive panel 11 has two transparent substrates, onto the opposing surfaces of which are provided liquid crystal drive electrodes, a color filter, an orientation film, an insulator film, and the like, the liquid crystal material being sealed between these opposing substrates. In addition, on the outside surface of one of the transparent substrates, a polarizer 62 is provided.

A compensating element 70 can be provided in the form of either a compensating film or a liquid crystal panel, this embodiment showing the case in which this is provided in the form of the compensating panel 70. The compensating panel 70 in general is formed by providing orientation films, insulating films, or the like, on the opposing surfaces of two transparent substrates made of glass or plastic, with a liquid crystal material sealed between the two opposing substrates. In addition, on the outer surface of one of the transparent substrates opposite to the substrate having the polarizer 62 thereon, is provided a polarizer 61.

On the liquid crystal panel holding side of the frame 50, a receiver 52 is provided for the purpose of holding of the compensating element 70, a protruding part 53 being provided on the side of the frame 50 opposite the receiver 52. A receiver 54 is provided on part of the protruding part 53 for the purpose of installing a transparent plate 100 in the form of a protective made from glass or the like. The protective glass 100 being adhesively attached to this receiver 54 as shown in FIG. 1, using doubled-sided adhesive tape (not shown in the drawing).

The receiver 52 has the compensating element 70 installed in it.

The drive panel 11 is covered by a panel support 90, which is formed from stainless steel, and supports the compensating element 70, which is installed in the receiver 52, with a spacer 80 in between it and the compensating element 70.

Although in this example the panel support 90 is made of stainless steel, which has an electromagnetic shielding action, it will understood that this could also be made of a metallic material such as aluminum or copper and could also be made from a resin material.

In this embodiment, although the spacer is made of PVC (polyvinyl chloride), it could also be made of a resin material, urethane, metal, or the like. In addition, while in this embodiment the spacer was a black PVC spacer which does not transmit light, it is also possible for the color to be a color other than black.

Figure 2:
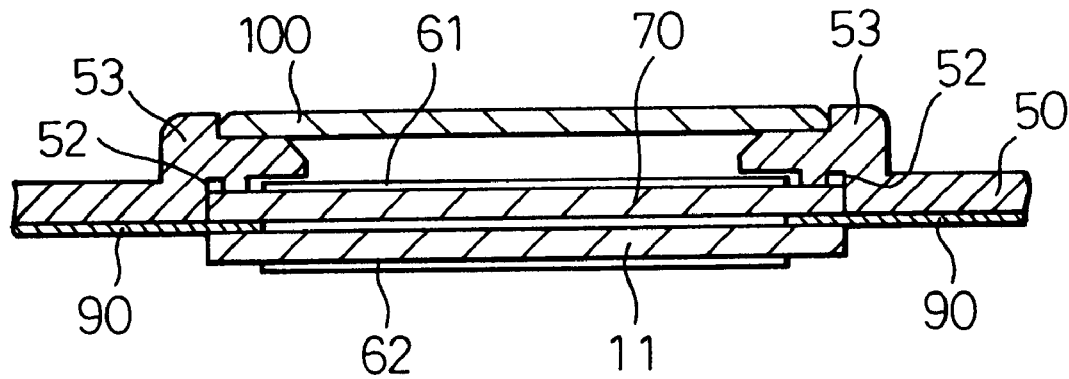
FIG. 2 is a cross-sectional view of a liquid crystal display device which is the second embodiment of the present invention.

FIG. 2 illustrates the construction of the second example of the first embodiment of the present invention. As can be seen from this drawing, the panel support 90 is extended, in this embodiment, up to the position of the spacer 80, which was shown in FIG. 1, so that the panel support 90 serves in place of the spacer 80, thereby reducing the number of parts when compared to the construction of FIG. 1.

In this example, two liquid crystal panels are used, with the liquid crystal panel received by the receiver 52 of the frame 50 being the compensating element 70. However, it is also possible to have a drive panel 11 as the liquid crystal panel which is received by the receiver 52 of the frame 50.

Furthermore, while in this example two liquid crystal panels are used, with one liquid crystal panel received by the receiver 52 of the frame 50, it is also possible to have two liquid crystal panels, mutually overlaid and with a spacer between them, received by receiver 52 of the frame 50.

In the above explanation, although the case of a liquid crystal panel being used as the compensating element 70 was discussed, the construction would be the same as described above even if a compensating film were to be used as the compensating element 70.

Also, although the above-described first example is capable of solving the above-described shortcomings, for liquid crystal panels measuring more than 5 diagonal inches, because the spacer is thin, warping and distortion of the spacer can occur, making positioning difficult and increasing the number of assembly steps.

The second embodiment of the present invention, which solves this problem, will be described next.

FIG. 3A is a perspective view of the main parts of a liquid crystal panel of the second embodiment of the present invention which has the same type of illumination device as shown in FIG. 6, viewed at an angle from the front. FIG. 3B and FIG. 3C show separated enlarged views of the drive panel 11 and the compensating panel 70 which make up the liquid crystal panel shown in FIG. 3A.

FIG. 4 is a side elevation view of the liquid crystal display device shown in FIG. 3A, seen from the direction indicated by the arrow A in FIG. 3A.

Although this liquid crystal panel has a seal, a liquid crystal, and electrodes, these will not be specifically described. The flexible printed circuit which is used to supply signals to the liquid crystal panel and connected by means of a conductive adhesive agent will also be omitted from the following description.

As shown in FIG. 4, positioners 55, positioners 56, and positioners 57 are arranged on a frame 50 having a window (indicated by the broken line) approximately the same as the image display area of the liquid crystal panel for positioning the liquid crystal panel or compensating member 70 made of compensating film. The arrangement of four positioners 55, two positioners 56, and two positioners 57 are shown in FIG. 3(A). Accordingly, the compensating member is positioned from four directions by the eight positioners.

Spacer supports 59 are provided on the frame 50 at two locations.

In the example shown, the spacer 80 has positioning cutouts 81 provided at two locations. While one pair of the above-noted positioning cutouts 81 and spacer supports 59 is sufficient, it is not necessary to specifically have just one pair. The number and location of the spacer supports 59 and the positioning cutouts 81 can be established so as to achieve stable positioning (seating) of the spacer 80 in its prescribed location with consideration given to the deformation of the spacer.

For the positioning of the drive panel 11, supports 58 are provided at two locations, and for positioning of the compensating element positioners 55 are provided at two locations, positioners 56 are provided at two locations, and positioners 57 are provided at two locations.

While the liquid crystal panel 11 is formed from at least two transparent substrates made of transparent glass, between which is held a liquid crystal, in this embodiment, as shown in FIG. 4, a drive panel is formed from two sheets of transparent glass, between which is held a liquid crystal, an integrated circuit 12, which is scanning electrode drive circuit, being mounted to an extension of the lower transparent glass 14 by means of chip-on-glass (COG) mounting, and an IC integrated circuit (not shown in the drawing), which is the signal electrode drive circuit, being COG-mounted to an extension of the other, top, transparent glass substrate.

If a spacer 53 made of a resilient material such as rubber, sponge, or epoxy is provided beneath the above-noted IC 12, there will be an increase in immunity to shock, but this spacer is not absolutely necessary.

Additionally, as shown in FIG. 3B, the construction of the drive panel in the present invention is formed by inserting a liquid crystal between two glass substrates 13 and 14, and as a convenience, sealing material (SL) is used.

In addition the two, upper and lower, transparent substrates 13 and 14 are provided with extending parts on the sides of these substrates which are mutually perpendicular, these extending parts having LSI devices or other integrated circuits mounted on them for the purpose of forming control circuits and drive circuits.

On the top surface of the extending part of the lower glass substrate 14 shown in FIG. 3B are chips 12, such LSI devices or other integrated circuits, are mounted and on the bottom surface of the extending part of the upper glass substrate 13 are mounted LSI devices or other integrated circuits 12', indicated by broken lines.

The compensating element used in the present invention, as shown in FIG. 3C, can have the same liquid crystal construction as the above-noted drive panel, the configuration of this being the same as shown in FIG. 3B. Because the drive circuits and control circuits are not required for this compensating element, this panel has neither the extending parts as shown in FIG. 3B, nor any drive and control circuits.

Turning now to the method of assembling the liquid crystal display device according to the present invention, first the panel support 90, which is formed from a metal for the purpose of acting as a shield, is place on top of the frame 50, the compensating liquid crystal panel which serves as the compensating element 70, being place between, in a manner so as to be positioned by, the positioners 55, the positioners 56, and the positioners 57.

Next, the spacer 80 is placed on the top of the compensating element 70 so that the spacer supports 59 are inserted in the positioning cutouts 81 provided in the spacer 80. The outer periphery of the spacer 80 is approximately positioned by the same positioners as is the compensating element 70.

Next, the drive panel 11 is placed on top of the spacer 80, so that it is located between the positioners 55 at two locations on the left side as shown in FIG. 3A, the positioners 56, the positioners 57, and the positioners 58, thereby supporting and positioning the drive panel 11.

When doing this, in terms of the method of positioning the drive panel 11 by means of the positioners 56, the drive panel 11 is constructed as a liquid crystal held between two transparent sheets of glass, and thus the solid line 11' formed between these two transparent sheets of glass 14 being indicated in FIG. 4, shows the contacting live thereof. The extending part of the transparent glass 14 below the dividing line has COG-mounted to it the IC 12. Although it is not shown in the drawing, the transparent glass above the line 11' is extended downward in FIG. 3A and is extended towards the viewer in FIG. 4. This extension is made on the lower glass so that it makes physical contact with the positioners 56, and is made on the upper glass so that its dimension extend beyond the positioners 56.

The above-noted extending part of the upper transparent glass sheets is such that it is positioned over the positioners 56, so that the upper transparent glass sheet is supported in the up and down directions. The step between the upper and lower transparent glass sheets is used so that the positioners 56 make physical contact with the step 15, which is the side surface of the lower transparent glass sheet, thereby acting to position the drive panel 11.

After installing the liquid crystal panel into frame 50 as described above, a prism sheet, a diffusing sheet and an illumination unit made of either a fluorescent tube and a reflector, or a fluorescent tube, a light-guiding element, and a reflector, are installed on top of the liquid crystal panel, the illumination unit being screw-mounted to the frame 50, and the combination of the illumination unit and the frame supporting the elements that are installed between the frame.

By virtue of the above constitution of the present invention, because a receiving area is provided on the frame and a protrusion is provided on the side part of the frame which corresponds to the receiving area, the amount of space within the liquid crystal display device is reduced, resulting in a reduction in the size of the liquid crystal display device.

Furthermore, a liquid crystal panel is installed into a receiving area of the frame, the liquid crystal panel is supported by means of the frame, and the other liquid crystal panel are supported by panel supports, and since the assembly is done in the sequence of the frame, the liquid crystal panel, the spacer, the panel supports, and then the liquid crystal pane, there are few liquid crystal panel supports required, thereby achieving a thin liquid crystal display device, with spacers acting as shock absorbers between the liquid crystal panels and facilitating replacement of the liquid crystal panel for maintenance purposes.

Because the spacer is supported by supporters, it is possible to reduce the number of assembly steps due to spacer deformation.

Also, by making use of the step that exists between the upper glass sheet and lower glass sheet that form the liquid crystal panel, it is possible to achieve a more compact liquid crystal display device in which it is possible to have the positioners located within the liquid crystal panel space.

In a second embodiment of a liquid crystal display device according to the present invention, it is possible for the above-noted minimum of two liquid crystal panel to include a drive liquid crystal panel and a compensating liquid crystal panel, and further possible for the above-noted liquid crystal panel to be supported by means of a plurality of positioners.

Furthermore, in the second embodiment of a liquid crystal display device according to the present invention, at least one of the above-noted liquid crystal panels is holding liquid crystal between two transparent glass sheets which are disposed so as to be mutually parallel, the periphery of the above-noted liquid crystal is sealed by means of a sealant, and a part of one of the two transparent glass sheets has an extending part that extends beyond the outer edge of the other transparent glass sheet. In the liquid crystal display device of the second embodiment of the present invention having a frame and a liquid crystal panel in which a step is formed at the outer edge of the two transparent glass sheet, it is possible, in addition to providing a plurality of positioners on the frame for the purpose of positioning the above-noted liquid crystal panels, to have a portion of the above-noted positioners make physical contact with the step in the above-noted liquid crystal panels and support the above-noted extending part, and further it is desirable to use at least two of the above-noted liquid crystal panels, this minimum of two liquid crystal panels including a drive liquid crystal panel and compensating liquid crystal panel.

Furthermore, it is desirable that the above-noted compensating liquid crystal panel have a phase-compensation function.

In a different form of the second embodiment of the present invention, the liquid crystal display device has at least a drive liquid crystal panel, a compensating liquid crystal panel, a frame having a display window, and the appropriate drive circuit part, the above-noted compensating liquid crystal panel being positioned in opposition to the display window side of the frame, and the above-noted drive liquid crystal panel being positioned on the opposite side of the above-noted compensating liquid crystal panel from the above-noted display window.

By virtue of the above-described construction the present invention, by providing a receiving area on the frame and by providing a protrusion corresponding to the receiving area on the outer side of the frame, the amount of space within the liquid crystal display device is reduced, resulting in a reduction in the size of the liquid crystal display device.

By installing a liquid crystal panel in the receiving area of the frame, the liquid crystal panel is supported by the frame and the other liquid crystal panel is supported by the panel support, the assembly being done in the sequence of the frame, the liquid crystal panel, the spacer, the panel support, and then the liquid crystal panel, so that it is possible to achieve a liquid crystal display device with a reduced number of liquid crystal panel supports, the spacer serving as a shock-absorbing material between the liquid crystal panels, thereby facilitating liquid crystal panel replacement for the purpose of maintenance.

By virtue of the construction of the present invention, when installing the compensating element and the like onto the drive panel, because it is possible to use common positioners to both support and position the drive panel and the compensating element, it is possible to reduce the number of positioners installed inside the frame, and the reduction in the number of positioners, and simplifies the shape of the frame, and reduces both the size and the cost of the liquid crystal display device.

We claim:

1. A liquid crystal display device comprising:
    liquid crystal panels, one of said panels being a compensating liquid crystal panel,
    a circuit for supplying electrical signals to the device,
    a frame having an outer surface, a hollow interior, and a receiving recess for receiving at least one of said liquid crystal panels in the hollow interior, and a protrusion protruding inwardly in the hollow interior to define an opening on the outer surface of said frame opposite the receiving recess, said opening being at the viewing side of the device,
    a transparent protector covering the opening, and
    at least one of said liquid crystal panels being positioned in said receiving recess in engagement with said protrusion, said at least one of said liquid crystal panels being said compensating liquid crystal panel.

2. A liquid crystal display device comprising:
    a first liquid crystal panel,
    a second liquid crystal panel,
    a circuit for supplying electrical signals to the device, and
    a frame having an outer surface and a receiving recess including a first opening, for receiving said first liquid crystal panel in the receiving recess, and a protrusion protruding inwardly in the frame and defining a second opening formed on the outer surface of said frame opposite the receiving recess, said first and second openings forming part of an open passageway through the frame,
    said first liquid crystal panel being positioned in the receiving recess at the protrusion,
    at least two positioners, for positioning said second liquid crystal panel, provided on and projecting from said frame at the periphery of said frame, said second liquid crystal panel being positioned by said at least two positioners, and
    said first and second liquid crystal panels positioned to overlie one another.

3. A liquid crystal display device as claimed in claim 2 wherein:
    said protrusion has a second protrusion projecting axially in the passageway and defining a receiving depth of the first opening, and said first liquid crystal panel being in engagement with the second protrusion.

4. A liquid crystal display device comprising:
    a first liquid crystal panel having a first two transparent glass substrates mounted in parallel to each other, a first liquid crystal held between the first two substrates, and a sealant which seals the liquid crystal at the periphery of at least one of said substrates,
    a second liquid crystal panel having a second two transparent glass substrates mounted in parallel to each other, one of said second two substrates having a section that extends beyond the outer edge of the other of said second two substrates to form a step on said second liquid crystal panel, and a second liquid crystal held between the second two substrates,
    a frame, said first liquid crystal panel mounted in said frame,
    a plurality of positioners provided on said frame for positioning said second liquid crystal panel, and
    at least two of said plurality of positioners being in physical contact with said step of said second liquid crystal panel.

5. A liquid crystal display device as claimed in claim 4 wherein:
    said frame has an outer surface and a receiving recess including a first opening, for receiving said first liquid crystal panel, a protrusion protruding inwardly in the frame and defining a second opening formed on the outer surface of said frame opposite the receiving recess, said first and second openings forming part of an open passageway through the frame,
    said first liquid crystal panel being positioned in said receiving recess at the protrusion,
    said plurality of positioners projecting from said frame at its periphery where said first opening is formed, and
    said first and second liquid crystal panels being positioned to overlie one another.

6. A liquid crystal display device comprising:
    at least two liquid crystal panels, one of which has two transparent glass substrates mounted in parallel to each other, a liquid crystal held between the two substrates, and a sealant which seals the liquid crystal at the periphery of at least one of said substrates,
    a circuit for supplying electrical signals to the device, and
    a frame having an outer surface and a receiving recess including a first opening, for receiving at least one of said two liquid crystal panels, and a protrusion protruding inwardly in the frame and formed in the outer surface of the frame opposite the receiving recess to define a second opening,
    at least one of said two liquid crystal panels being positioned in said receiving recess in engagement with said protrusion,
    a spacer made of a light-blocking material and positioned to overlie the liquid crystal panel in said receiving recess and cover said sealant,
    the other of said liquid crystal panels positioned to cover the spacer,
    a plurality of spacer supports extending outwardly from the frame, and
    a plurality of cutouts formed in the spacer for mating respectively with the spacer supports to position the spacer in a prescribed location.

7. A liquid crystal display device as claimed in claim 6 wherein:
    the other of said two liquid crystal panels has a second two transparent glass substrates mounted in parallel to each other, and one of said second two substrates has a section that extends beyond the outer edge of the other of said second two substrates to form a step on said second liquid crystal panel.

8. A liquid crystal display device as claimed in claim 6 wherein:

said at least one of said two liquid crystal panels is a compensating liquid crystal panel.

9. A liquid crystal display device comprising:

at least first and second liquid crystal panels, said first liquid crystal panel having two transparent glass substrates mounted in parallel to each other, a liquid crystal held between the two substrates, and a sealant which seals the liquid crystal at the periphery of at least one of said substrates, a circuit for supplying electrical signals to the device, and a frame having an outer surface and a receiving recess including a first opening, for receiving said first liquid crystal panel, and an annular protrusion protruding inwardly in the frame and formed in the outer surface of said frame opposite the receiving recess to define a second opening, said first liquid crystal panel being positioned in said receiving recess, a plurality of positioners, for positioning said second liquid crystal panel, projecting from said frame at the periphery of said frame, a spacer made of a light-blocking material and positioned to overlie the first liquid crystal panel and cover said sealant, said spacer positioned by less than all of said plurality of positioners, and said second liquid crystal panel positioned to cover said spacer by less than all of said plurality of positioners.

10. A liquid crystal display device as claimed in claim 9 wherein:

said second liquid crystal panel has second two transparent glass substrates mounted in parallel to each other, and one of said second two substrates has a section that extends beyond the outer edge of the other of said second two substrates to form a step on said second liquid crystal panel.

11. A liquid crystal display device as claimed in any one of claims 6–10 wherein:

said spacer is annular in shape.

12. A liquid crystal display device as claimed in claims 11 wherein:

said spacer has an inner periphery positioned inwardly of the outer surface.

13. A liquid crystal display device as claimed in any one of claims 6–10 wherein:

said spacer is made of a material which acts as an electromagnetic shield.

14. A liquid crystal display device comprising:

at least first and second liquid crystal panels, said first liquid crystal panel having two transparent glass substrates mounted in parallel to each other, a liquid crystal held between the two substrates, and a sealant which seals the liquid crystal at the periphery of at least one of said substrates, a circuit for supplying electrical signals to the device, and a frame having an outer surface and a receiving recess including a first opening, for receiving said first liquid crystal panel, and an annular protrusion protruding inwardly in the frame and formed in the outer surface of said frame opposite the receiving recess to define a second opening, said first liquid crystal panel being positioned in said receiving recess, a plurality of positioners, for positioning said second liquid crystal panel, projecting from said frame at the periphery of said frame, a spacer made of a light-blocking material and positioned to overlie the first liquid crystal panel and cover said sealant, said spacer positioned by less than all of said plurality of positioners, said second liquid crystal panel positioned to cover said spacer by less than all of said plurality of positioners, a plurality of spacer supports extending outwardly from the frame, and a plurality of cutouts formed in the spacer for mating respectively with the spacer supports to position the spacer in a prescribed location.

15. A liquid crystal display device as claimed in claim 14 wherein:

said second liquid crystal panel has second two transparent glass substrates mounted in parallel to each other, and one of said second two substrates has a section that extends beyond the outer edge of the other of said second two substrates to form a step on said second liquid crystal panel.

\* \* \* \* \*